US012785495B2

(12) United States Patent
Takenaka

(10) Patent No.: US 12,785,495 B2
(45) Date of Patent: Nov. 3, 2026

(54) PROTECTIVE COVER FOR CONNECTOR AND CABLE

(71) Applicant: TOYOTA JIDOSHA KABUSHIKI KAISHA, Toyota (JP)

(72) Inventor: Tetsuhiro Takenaka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 18/753,468

(22) Filed: Jun. 25, 2024

(65) Prior Publication Data

US 2025/0079931 A1 Mar. 6, 2025

(30) Foreign Application Priority Data

Aug. 31, 2023 (JP) ................................ 2023-141464

(51) Int. Cl.
*H02K 5/22* (2006.01)
*H02K 11/00* (2016.01)

(52) U.S. Cl.
CPC ......... *H02K 5/225* (2013.01); *H02K 11/0094* (2013.01)

(58) Field of Classification Search
CPC ........... H02K 5/22; H02K 5/225; H02K 11/00
USPC ...................................................... 310/71, 89
See application file for complete search history.

(56) References Cited

U.S. PATENT DOCUMENTS 4,709,306 A * 11/1987 Harris .................. B60Q 1/0683 362/419
5,718,377 A * 2/1998 Tedders ................. A01N 63/14 47/1.01 R
12,103,340 B2 * 10/2024 Schroedel ........... B60C 23/0498
2005/0054234 A1 * 3/2005 Daniel ...................... H02K 3/50 439/357
2006/0005991 A1 * 1/2006 Zamzow ................ H02K 41/02 174/120 SC
2009/0025952 A1 * 1/2009 Holmes .................. B60K 6/405 475/5
2010/0170693 A1 * 7/2010 Szilagyi ................. H01B 7/288 174/113 R
2010/0243321 A1 * 9/2010 Adachi .................. H02K 5/225 29/868
2010/0248529 A1 * 9/2010 Adachi .................. H02K 11/33 439/447

(Continued)

FOREIGN PATENT DOCUMENTS

JP 2010-239678 A 10/2010
JP 2011-146195 A 7/2011

(Continued)

*Primary Examiner* — Rashad H Johnson
(74) *Attorney, Agent, or Firm* — SoraIP, Inc.

(57) ABSTRACT

A protective cover for a cable connected to a connector and a connector of an electric device mounted on a vehicle, the protective cover comprising: a first rigid protective member covering the connector; a second rigid protective member covering the cable extending from the connector at a position away from the connector; and a flexible connecting member provided in a gap between the first rigid protective member and the second rigid protective member and coupling the first rigid protective member and the second rigid protective member in a state of being bent away from the cable.

12 Claims, 3 Drawing Sheets

(56) References Cited

U.S. PATENT DOCUMENTS

2013/0140018 A1* 6/2013 Invierno ................ H05B 3/565
166/57
2013/0140927 A1* 6/2013 Murata ................. E02F 9/0858
310/71
2013/0181674 A1* 7/2013 Tremblay ................ B60L 53/16
320/109
2017/0149363 A1* 5/2017 Schroedel ................. H02P 5/74
2018/0072128 A1* 3/2018 Pfeiffer .................. H02K 5/225
2019/0375351 A1* 12/2019 Adachi .................. H01R 11/12
2020/0070748 A1* 3/2020 Kogure ............... B60R 16/0215
2020/0083777 A1* 3/2020 Tominaga .............. H02K 5/225
2020/0384870 A1* 12/2020 Matsui .................... B60L 53/18
2021/0270091 A1* 9/2021 Kinkaid ................ E21B 17/028
2021/0281157 A1* 9/2021 Hsu ..................... B30B 15/0094
2023/0142261 A1* 5/2023 Nafe ....................... E21C 31/12
310/71
2023/0142831 A1* 5/2023 Saito .................... H01R 13/621
310/71
2023/0382168 A1* 11/2023 Schroedel ........... B60C 23/0498
2024/0131944 A1* 4/2024 Lamore ................... B60L 53/35
2024/0213848 A1* 6/2024 Pfister ....................... F01P 5/04
2025/0079931 A1* 3/2025 Takenaka ........... H02K 11/0094
2025/0105708 A1* 3/2025 Bonny ..................... H02K 9/06
2025/0196673 A1* 6/2025 Wang ...................... B60L 53/16

FOREIGN PATENT DOCUMENTS

JP 2013-066327 A 4/2013
JP 2015-026428 A 2/2015
JP 2019-160712 A 9/2019
JP 2023-034322 A 3/2023

* cited by examiner

PROTECTIVE COVER FOR CONNECTOR AND CABLE

CROSS-REFERENCE TO RELATED APPLICATION

This application claims priority to Japanese Patent Application No. 2023-141464 filed on Aug. 31, 2023, incorporated herein by reference in its entirety.

BACKGROUND

1. Technical Field

The technology disclosed herein relates to a protective cover, for example, for a connector of an electric device mounted on a vehicle and for a cable.

2. Description of Related Art

Electrified vehicles include various electric devices such as motors and inverters for driving wheels. For example, these electric devices include connectors for connecting cables through which high-voltage power is transmitted. A protective cover for protecting such connector and cable from external factors has been proposed (Japanese Unexamined Patent Application Publication No. 2013-66327 (JP 2013-66327 A)).

SUMMARY

However, the protective cover may degrade visibility at the time of checking intrusion of foreign matter into the vicinity of the cable, or may reduce the space for checking the cable.

The present specification provides a technology for improving ease of check on a cable while ensuring necessary protection performance for a connector and a cable.

The technology disclosed herein is embodied as a protective cover for a connector of an electric device mounted on a vehicle and a cable connected to the connector. The protective cover includes:

- a first rigid protective member that covers the connector; and
- a second rigid protective member that covers the cable extending from the connector at a position distant from the connector.

The protective cover further includes a flexible connecting member that is provided in a clearance between the first rigid protective member and the second rigid protective member and connects the first rigid protective member and the second rigid protective member while slacking away from the cable.

With such a protective cover, the connector and the cable are protected from external impact and foreign matter intrusion by the first rigid protective member and the second rigid protective member. Further, the flexible connecting member interposed in the clearance between the rigid protective members ensures visibility and accessibility of the cable in the vehicle. Such a protective cover can contribute to improvement in detection of a trouble such as the intrusion of foreign matter into and near the cable attached to the electric device of the vehicle while protecting the connector and the cable.

With such a protective cover, it is possible to easily cope with the bent shape of the cable.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment disclosed herein can include a protective cover for a cable connected to a connector and a connector of an electrical device mounted on a vehicle, the protective cover including a first rigid protective member covering the connector, a second rigid protective member covering the cable extending from the connector at a position away from the connector, and a flexible connecting member provided in a gap between the first rigid protective member and the second rigid protective member to couple the first rigid protective member and the second rigid protective member in a state of being flexed away from the cable.

In one aspect of the above embodiment, the connector may be attached to a side surface of the electric device in the vehicle width direction, and the flexible connecting member may be bent so as to bulge in the vehicle width direction. According to this aspect, when the load is input to the first rigid protective member or the second rigid protective member, both of them are connected by the flexible connecting member, so that the load is hardly transmitted to the other.

In one aspect of the above embodiment, the flexible connecting member may be a mesh-shaped sheet body. According to this aspect, it is possible to enhance the flexibility of the flexible connecting member while securing the foreign matter intrusion property. In addition, the mesh shape contributes to improvement of visibility.

According to an aspect of the above embodiment, the electric device may be an electric drive module including at least a drive motor of the vehicle. According to this aspect, it is possible to protect the cable connected to the electric drive module of the vehicle and to ensure easy inspection.

Another embodiment disclosed herein is an electrified vehicle comprising an electrical device and the protective covering provided to the electrical device. According to this embodiment, a vehicle that is excellent in visibility and easy inspection of a cable is provided.

Hereinafter, a protective cover for a vehicle disclosed in the present specification will be described with reference to the drawings as appropriate. In this specification, vehicles are electrified vehicle. Electrified vehicle is not particularly limited, and examples thereof include vehicles that drive driving wheels by motors, such as battery electric vehicle (BEV), hybrid electric vehicle (HEV), plug-in hybrid electric vehicle (PHEV), fuel cell electric vehicle (FCEV).

Figure 1:
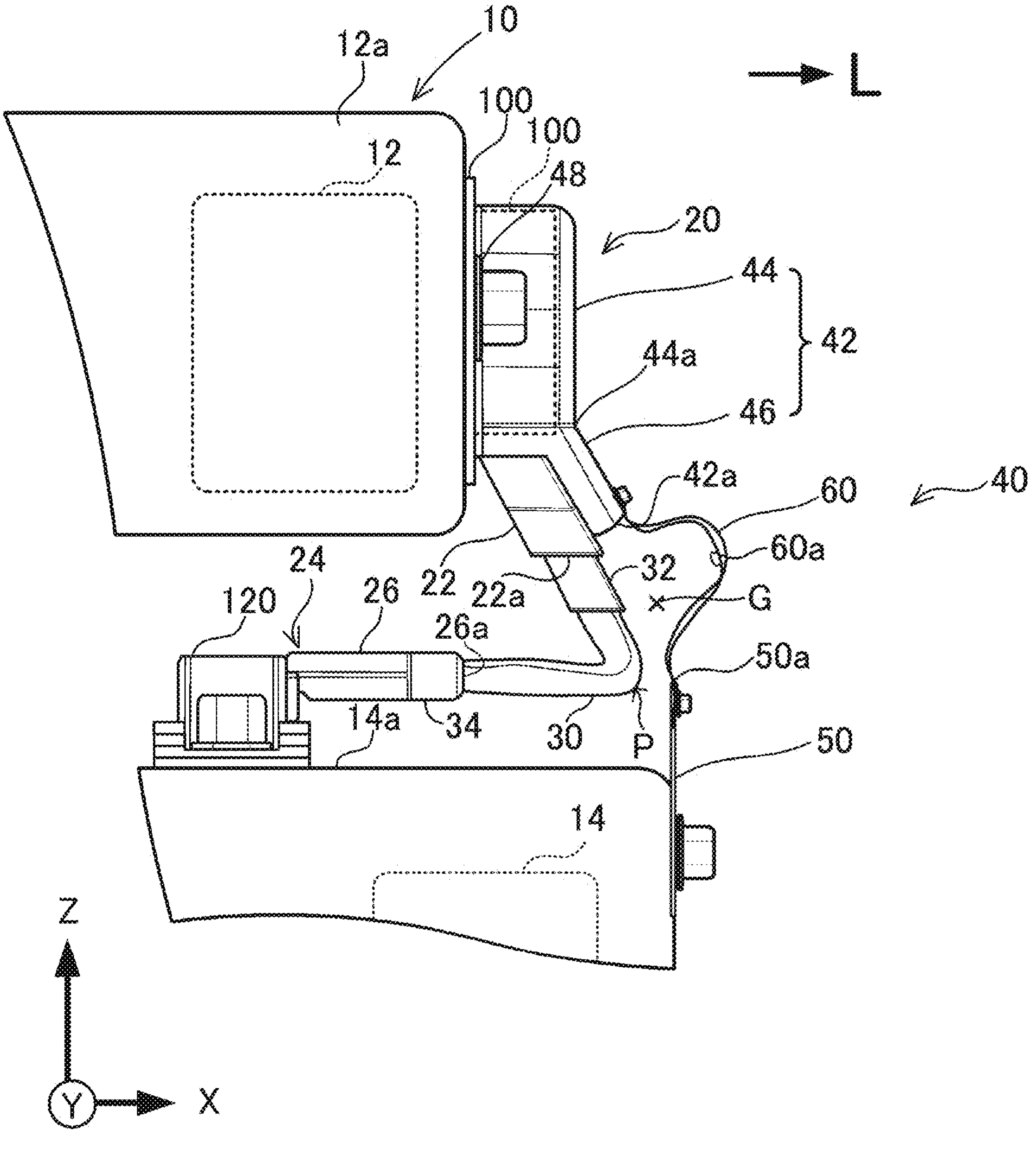
FIG. 1 is a cross-sectional view of a protective cover attached to a left side surface of an electric axle mounted on a vehicle as viewed from the front of the vehicle.
Figure 2:
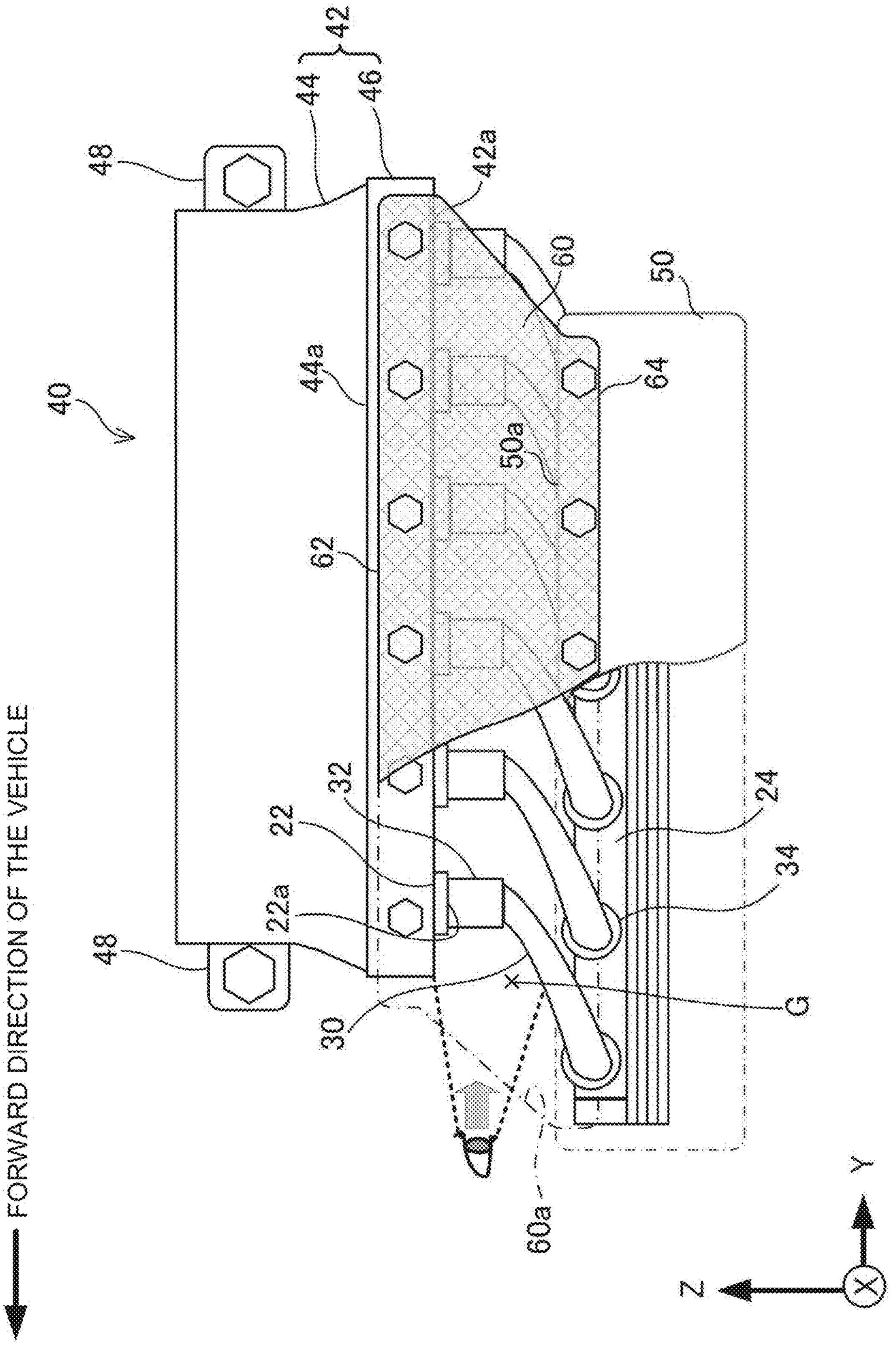
FIG. 2 is a view of the protective cover shown in FIG. 1 as viewed from the left direction of the vehicle, with a part of the protective cover on the front side of the vehicle of the cable cover and the connecting member broken.

FIG. 1 is a diagram illustrating an exemplary connector 20, a cable 30, and a protective cover 40 in an electric axle 10 mounted on a vehicle, and illustrating the protective cover 40 as a cross-sectional view from a front side of the vehicle. Further, FIG. 2 is a view of the protective cover 40 as viewed from the left direction (L direction) at the vehicle side, and shows the cable cover 50 and the connecting member 60 with a part of the vehicle front side broken. In FIG. 1 and FIG. 2, the vehicle widthwise direction is indicated by X, the front-rear direction of the vehicle is indicated by Y, and the vertical direction of the vehicle is indicated by Z. In the following description, unless otherwise specified, the up-down direction, the left-right direction, and the front-rear direction refer to the up-down direction, the left-right direction, and the front-rear direction of the vehicle.

The protective cover 40 protects the cable 30 attached to the electric axle 10 mounted on the vehicle and the connector 20 to which the cable 30 is connected.

The electric axle 10 is an electric module including an inverter 12, a motor 14, and a transmission. The electric axle 10 is disposed near the center of the front compartment of the vehicle, for example. The electric axle 10 is an example of an electric device in the present specification. The electric axle 10 includes, for example, an inverter 12 that generates drive power for driving the motor 14 at an upper portion thereof, and a motor 14 at a lower portion thereof. The electric axle 10 includes an inverter case 12*a* that houses the inverter 12, and a motor case 14*a* that houses the motor 14.

In the present specification, the electric device is not particularly limited, but an electric device that is supplied with high-voltage power (i.e., a high DC 60 V power or a high AC 30 V power) may be preferable. This is because there is a higher demand for increased safety. The electric device is not limited to an electric drive module such as the electric axle 10, and may be a motor, an inverter, an A/C compressor, or the like.

The inverter case 12*a* includes a connector 20. The connector 20 electrically connects the cable 30 to the inverter 12. The connector 20 includes one or more, for example, six terminals (not shown) on the terminal block 100 attached to the left side wall of the vehicle of the inverter case 12*a*, and a cable joint 22 capable of connecting the plugs 32 of the inverter-side of the six cables 30 to each of the six terminals.

Although not shown, the six terminals are provided on the terminal block 100 side by side along the front-rear direction. These terminals are connected to the inverter 12. Cable joint 22, for example, is provided by being inserted into an insertion port (not shown) formed on the lower side of the six terminals of the terminal block 100. The cable joint 22 has six insertion ports 22*a* into which the plugs 32 of the six cables 30 on the inverter 12 side can be inserted. The cable joint 22 extends obliquely downward to the left so as to be separated from the inverter case 12*a*, and a lower end portion thereof serves as an insertion port 22*a*. The plugs 32 of the six cables 30 are inserted into the six insertion ports 22*a*, the six cables 30 are connected to the terminals on the terminal block 100, respectively.

The motor case 14*a* includes a connector 24. The connector 24 electrically connects the cable 30 to the motor 14. The connector 24 includes six terminals (not shown) on the terminal block 120 attached to the upper wall of the motor case 14*a*, and a cable joint 26 capable of connecting the plugs 34 of the motor 14-side of the six cables 30 to the respective terminals.

Although not shown, the six terminals are provided on the terminal block 120 side by side along the front-rear direction. These terminals are respectively connected to the motor 14. The cable joint 26 is provided by being inserted into an insertion port (not shown) formed on the left side of the six terminals of the terminal block 120. The cable joint 26 has six insertion ports 26*a* into which the plugs 34 of the six cables 30 on the inverter 12 side can be inserted. The cable joint 26 extends substantially horizontally leftward away from the motor case 14*a* from the center of the vehicle, and has a left end portion that is an insertion port 26*a*. The plugs 34 of the six cables 30 are inserted into the six insertion ports 26*a*, the six cables 30 are connected to the terminals on the terminal block 120, respectively.

Each of the plurality of cables 30 connects to the connectors 20 and 24 as described above. Each cable 30 is configured by bundling a plurality of wire strands, and has a large diameter of about several tens of millimeters as a whole, and is flexible.

As described above, each of the cables 30 includes a plug 32 that is electrically connectable to the connector 20 of the inverter case 12*a*. In addition, each of the cables 30 includes a plug 34 that is electrically connectable to the connector 24 of the motor case 14*a*.

For example, as shown in FIG. 1, when the cable 30 connects between the connector 20 and the connector 24, from the positional relationship between the connector 20 and the connector 24, the cable 30 from the lower end of the connector 20 toward the lower left, then bent toward the vehicle center side to take a curved shape toward the connector 24 along a substantially horizontal direction. That is, the cable 30 has a substantially L-shape having a bent portion P bent to the leftmost side.

The protective cover 40 covers the left side of the connector 20 and the cable 30 including the six terminals (not shown) and the cable joint 22 on the terminal block 100. The protective cover 40 includes a connector cover 42, a cable cover 50, and a connecting member 60.

The connector cover 42 covers the left side of the connector 20. The connector cover 42 includes a terminal cover portion 44 and a joint cover portion 46.

The terminal cover portion 44 is formed to bulge leftward so as to form a space mainly surrounding six terminals corresponding to the plurality of cables 30. The joint cover portion 46 extends obliquely downward to the left from the lower end edge 44*a* of the terminal cover portion 44 and covers the cable joint 22. Each of the terminal cover portion 44 and the joint cover portion 46 is formed of a steel plate having high rigidity and a predetermined thickness, and constitutes an integral connector cover 42. The connector cover 42 is fixed to the left side wall of the inverter case 12*a* by being bolted, for example, at a flat flange portion 48 provided at the front and rear end edges of the terminal cover portion 44. The connector cover 42 is an example of the first rigid protective member in this specification.

The cable cover 50 covers the left side of a portion of the cable 30 that is a predetermined distance away from the plug 32. In addition, the cable cover 50 covers the left side of the portion near and below the bent portion P of the cable 30.

The cable cover 50 is disposed substantially along the lower edge 42*a* of the connector cover 42 so as to be spaced a predetermined distance-downward and leftward from the lower edge 42*a*. The cable cover 50 is a substantially plate-shaped member having an upper edge portion 50*a* along the vicinity of the bent portion P of the six cables 30. The cable cover 50 is disposed on the left side of the lower edge 42*a* of the connector cover 42. The cable cover 50 is fixed, for example, by being bolted to the left side wall of the motor case 14*a*. The cable cover 50 is an example of the second rigid protective member in the present specification.

The connecting member 60 is provided in a gap G between the connector cover 42 and the cable cover 50. The connecting member 60 is a sheet body having flexibility and having a mesh shape formed of a metal wire. The connecting member 60 has, for example, a mesh size such that foreign matters, such as water droplets and fine foreign matters, which may cause a defect with respect to the cable 30, can be prevented from entering from the left side. Further, the connecting member 60 is formed to be thin enough to form a sufficient space around the cable 30 while covering the gap G. The connecting member 60 is an example of a flexible connecting member shown herein.

The connecting member 60 mainly covers the plug 32 of the cable 30, the vicinity of the bent portion P, and the left side of the lower portion thereof. Further, the connecting member 60 includes an open portion 60*a* which is opened at the front of the vehicle in the gap G between the connector cover 42 and the cable cover 50. The connecting member 60 is also provided in a state of being bent leftward so as to be separated from the plug 32 of the cable 30 or the like in the gap G. Therefore, a sufficient space is formed from the front of the vehicle toward the rear of the vehicle in the vicinity of the gap G and in the vicinity of the plug 32 and the bent portion P of the cable 30.

The connecting member 60 is fixed to the joint cover portion 46 of the connector cover 42 at its upper edge portion 62 by, for example, bolting, and the lower edge portion 64 of the connecting member 60 is fixed to the upper edge portion 50*a* of the cable cover 50 by, for example, bolting, and the like.

Next, the operation of the protective cover 40 will be described. According to the protective cover 40, the connector cover 42 and the cable cover 50 can protect the connector 20 and a portion of the cable 30 away from the connector 20 from various external inputs that enter from the vehicle outer direction of the protective cover 40.

As shown in FIGS. 1 and 2, the gap G extending in the front-rear direction between the connector cover 42 and the cable cover 50, by covering the connecting member 60 having flexibility in a bent condition, the cable 30 in the vicinity of the gap G can be visually recognized from the open portion 60*a*, and it is possible to easily secure an accessible space for inspection. Therefore, according to the protective cover 40, the connector 20, the cable 30, and the like are protected, and the case of inspection of the connector 20 and the cable 30 is improved.

In addition, since the connecting member 60 also has a constant external input blocking property, it is possible to suppress intrusion of water or foreign matter from the vehicle outer direction even in the gap G. Further, since the connecting member 60 is a mesh-shaped sheet body, it is possible to ensure a certain visibility of the connector 20 and the cable 30 from the vehicle upper side via the connecting member 60.

Figure 3A:
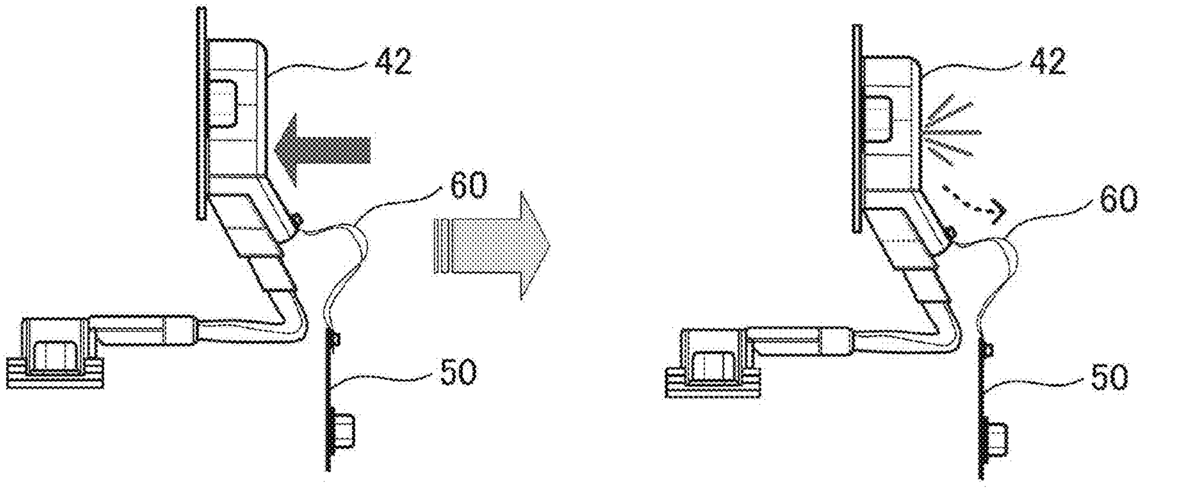
FIG. 3A is an illustration of the protective covering shown in FIG. 1 showing the situation when an impact is applied from the left side of the car.
Figure 3B:
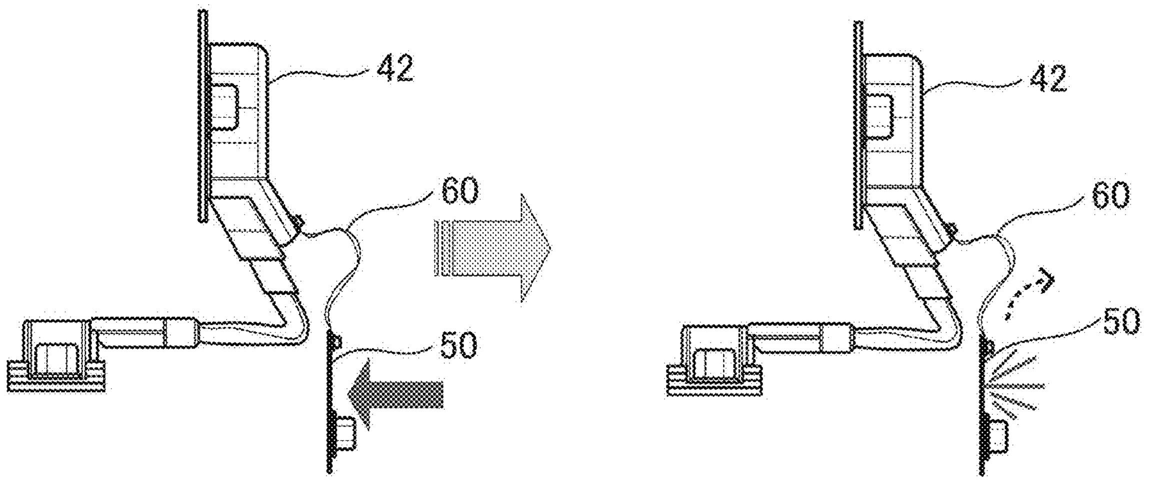
FIG. 3B is another example of a diagram showing a situation when an impact is inputted from the vehicle-left to the protective covering shown in FIG. 1.

Further, for example, as shown in FIG. 3A and FIG. 3B, when the load from the left side of the vehicle is input and the member on the left side of the cable cover 50 is moved toward the connector 20 or the cable 30, the input of the load to the connector 20 or the cable 30 is suppressed by the connector cover 42 or the cable cover 50. Further, since the connecting member 60 has flexibility, the load input to the connector cover 42 or the cable cover 50 is less likely to be transmitted to the cable cover 50 or the connector cover 42. Therefore, damage to both the connector 20 and the cable 30 at the same time is suppressed.

Although not shown, even when a load is input to the connector 20 or the cable 30 from a direction other than the vehicle left side such as the front of the vehicle, the load is not easily transmitted to the cable cover 50 or the connector cover 42 due to the presence of the connecting member 60.

Further, as described above, by including the connector cover 42 and the cable cover 50 via the connecting member 60, the connector cover 42 and the cable cover 50 which can more reliably protect the connector 20 and the cable 30 according to the input mode of the assumed external load can be designed shape and arrangement.

In the above-described embodiment, the connector cover 42 of the inverter 12 is the first rigid protective member, and the cable cover 50 of the cable 30 connected to the inverter 12 is the second rigid protective member, but the present disclosure is not limited thereto. The first rigid protective member and the second rigid protective member may protect the connector and the cable of the electrical device to which the protective cover is applied.

Although the connector 20 includes a terminal in the terminal block 100, the present disclosure is not limited thereto. For example, a terminal may be provided for the inverter case 12*a* without interposing the terminal block 100.

Although the cable 30 is connected to the connector 20 via the plug 32, the present disclosure is not limited thereto. One end of the cable 30 may be connected to the connector 20 without using the plug 32.

According to the above description, the present specification includes the following configurations.

[1] A protective cover for a cable connected to a connector and a connector of an electric device mounted on a vehicle, A first rigid protective member covering the connector, A second rigid protective member covering the cable extending from the connector at a location remote from the connector;

A flexible connecting member for connecting the first rigid protective member and the second rigid protective member in a state of being provided in a gap between the first rigid protective member and the second rigid protective member and being bent away from the cable, A protective cover comprising:

[2] The connector is attached to a side surface of the electric device in the vehicle width direction, The protective cover according to [1], wherein the connecting member has a configuration in which the connecting member is bent so as to bulge in the vehicle width direction.

[3] The protective cover according to [1] or [2], wherein the connecting member is a mesh-shaped sheet body.

[4] The protective cover according to any one of [1] to [3], wherein the electric device is a unit including at least a driving motor of the vehicle.

[5] An electrified vehicle, electric device,

A protective cover according to any one of [1] to [4] provided for the electric device.

What is claimed is:

1. A protective cover that covers a first connector provided on a first electric device mounted on a vehicle and a cable connected to the first connector, the protective cover comprising:

a first rigid protective member that covers the first connector;

a second rigid protective member that covers the cable at a position distant from the first connector; and a flexible connecting member provided in a clearance between the first rigid protective member and the second rigid protective member and connecting the first rigid protective member and the second rigid protective member while slackened away from the cable, wherein the cable includes a first end connected to the first connector and a second end connected to a second connector provided on a second electric device, the second connector being located at a position spaced apart from the second rigid protective member, the flexible connecting member includes a first edge portion fixed to the first rigid protective member and a second edge portion fixed to the second rigid protective member, and the flexible connecting member is bent such that a distance between the flexible connecting member and the cable increases from each of the first edge portion and the second edge portion toward a center portion of the flexible connecting member.

2. The protective cover according to claim 1, wherein:

the first connector is attached to a side surface of the first electric device in a vehicle width direction; and the flexible connecting member has a slack shape projecting in the vehicle width direction.

3. The protective cover according to claim 2, wherein the flexible connecting member is bent to bulge in the vehicle width direction such that a load applied to one of the first rigid protective member and the second rigid protective member is inhibited from being transmitted between the first rigid protective member and the second rigid protective member.

4. The protective cover according to claim 1, wherein the flexible connecting member is a mesh sheet member.

5. The protective cover according to claim 1, wherein the first electric device includes an inverter, the second electric device includes a drive motor, the first connector is provided on an inverter case housing the inverter, and the second connector is provided on a motor case housing the drive motor.

6. The protective cover according to claim 5, wherein the first electric device and the second electric device are configured to be supplied with high-voltage power.

7. An electrified vehicle comprising:

a first electric device;

a second electric device; and the protective cover according to claim 1 that is provided on the first electric device.

8. The protective cover according to claim 1, wherein the flexible connecting member includes an open portion on a vehicle front side of the clearance defined between the first rigid protective member and the second rigid protective member, the open portion being configured to allow access to the cable.

9. The protective cover according to claim 8, wherein the clearance extends in a vehicle front-rear direction.

10. The protective cover according to claim 1, wherein the cable is connected to the first connector via a plug, and the flexible connecting member is bent so as to be spaced apart from the plug of the cable.

11. The protective cover according to claim 1, wherein the first edge portion of the flexible connecting member is fixed to the first rigid protective member by a bolt, and the second edge portion of the flexible connecting member is fixed to the second rigid protective member by a bolt.

12. The protective cover according to claim 1, wherein the clearance extends in a vehicle front-rear direction.

* * * * *